United States Patent
Deblauwe et al.

(10) Patent No.: US 7,015,287 B2
(45) Date of Patent: Mar. 21, 2006

(54) COMPOSITIONS BASED ON RANDOM PROPYLENE COPOLYMERS, PROCESS FOR THEIR MANUFACTURE, AND HEAT-SEALABLE MULTILAYER SHEETS COMPRISING THEM

(75) Inventors: Veerle Deblauwe, Londerzeel (BE); Olivier Lhost, Havre (BE); Giuliano Bertozzi, Rosignano (IT)

(73) Assignee: Polyproylene Belgium, (BE)

( * ) Notice: Subject to any disclaimer, the term of this patent is extended or adjusted under 35 U.S.C. 154(b) by 150 days.

(21) Appl. No.: 10/468,533

(22) PCT Filed: Feb. 18, 2002

(86) PCT No.: PCT/EP02/01783

§ 371 (c)(1), (2), (4) Date: Aug. 19, 2003

(87) PCT Pub. No.: WO02/068531

PCT Pub. Date: Sep. 6, 2002

(65) Prior Publication Data

US 2004/0082723 A1    Apr. 29, 2004

(30) Foreign Application Priority Data

Feb. 22, 2001  (FR) .................................. 01/02533

(51) Int. Cl.
  C08F 8/00   (2006.01)
  C08L 23/00  (2006.01)
  C08L 23/04  (2006.01)
(52) U.S. Cl. ...................................... 525/191; 525/240
(58) Field of Classification Search ................ 525/191, 525/240
  See application file for complete search history.

(56) References Cited

U.S. PATENT DOCUMENTS 4,481,336 A * 11/1984 Fujii et al. ................... 525/323
6,258,893 B1 * 7/2001 Okayama et al. ........... 525/191

* cited by examiner

Primary Examiner—Nathan M. Nutter
(74) Attorney, Agent, or Firm—James R. Henes; David P. Yusko

(57) ABSTRACT

Compositions based on propylene polymers (compositions (C)) comprising: a) from 61 to 74% by weight of a random propylene copolymer (copolymer (A)) comprising from 8 to 16% by weight of monomer units derived from 1-butene and less than 0.5% by weight of monomer units derived from ethylene, and b) from 39 to 26% by weight of a random propylene copolymer (copolymer (B)) comprising from 35 to 50% by weight of monomer units derived from 1-butene and from 0 to 1% by weight of monomer units derived from ethylene. Process for the manufacture of these compositions.

20 Claims, 1 Drawing Sheet

Figure 1:
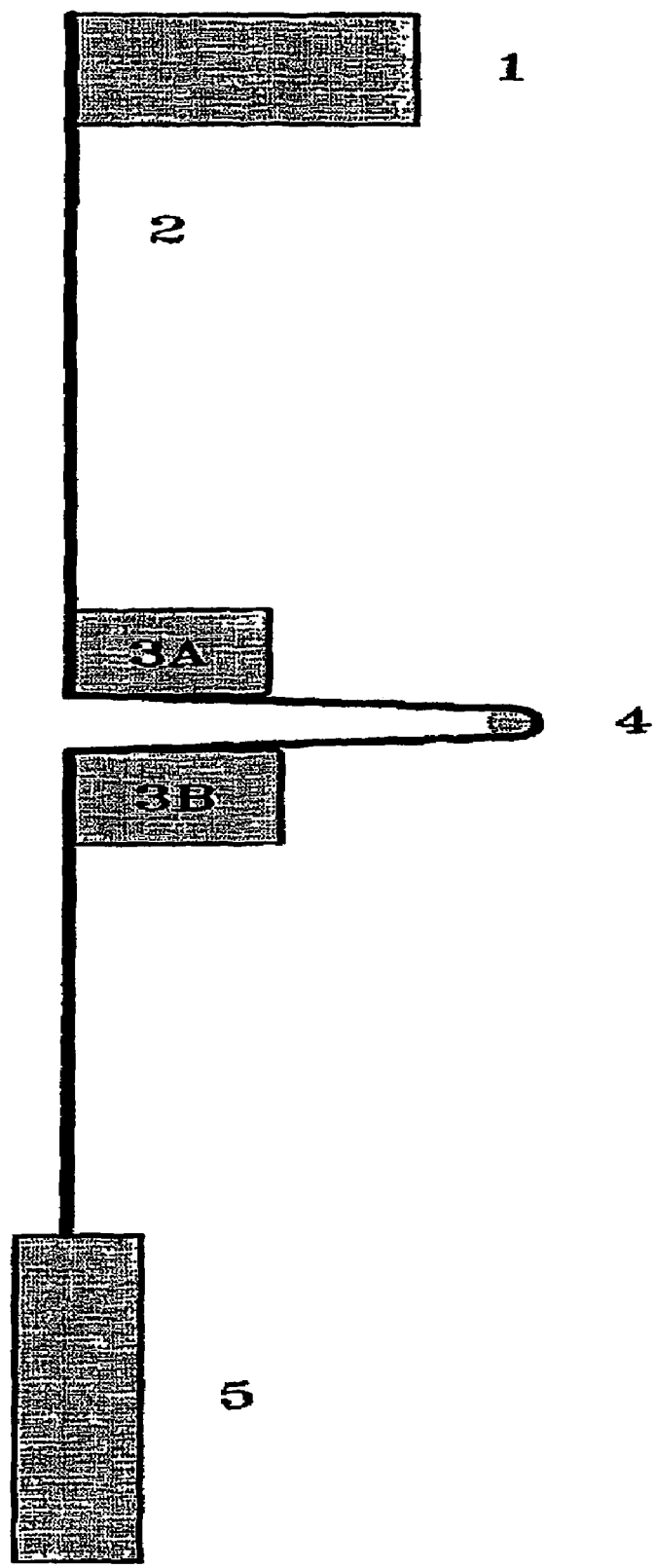

COMPOSITIONS BASED ON RANDOM PROPYLENE COPOLYMERS, PROCESS FOR THEIR MANUFACTURE, AND HEAT-SEALABLE MULTILAYER SHEETS COMPRISING THEM

The present invention relates to compositions based on random propylene copolymers. It relates more particularly to compositions exhibiting both a relatively high melting temperature and a very low sealing temperature comprising two random propylene copolymers with different compositions. The present invention also relates to a process for the manufacture of these compositions. Finally, it relates to heat-sealable multilayer sheets, at least one heat-sealable layer of which comprises the said compositions.

It is known to use random propylene co- or terpolymers comprising a few % by weight of ethylene and/or of 1-butene for the manufacture of the heat-sealable layers (known as "sealing layers") of multilayer sheets for packaging, the central layer of which is based on a crystalline propylene polymer, which are generally biaxially oriented (known as "BOPP films").

One disadvantage of these random co- and terpolymers is the fact that, at a given sealing temperature (hereinafter known more concisely as ST), the melting temperature (hereinafter known more concisely as MT) is too low for use on certain machines for the manufacture of sheets, thus resulting in problems of adhesion to the rollers of these machines.

Attempts have been made to overcome these advantages by using compositions comprising two propylene copolymers comprising variable amounts of monomer units derived from ethylene and/or 1-butene.

Mention may be made, as examples of documents disclosing such compositions, of:

the document EP-A-0 560 326, which discloses semi-crystalline compositions based on propylene copolymers comprising:

from 20 to 60% by weight of a random copolymer (A) of propylene and of a $C_{4-10}$ α-olefin comprising from 1 to 10% by weight of $C_{4-10}$ α-olefin;

from 40 to 80% by weight of a random copolymer (B) of propylene and of a $C_{4-10}$ α-olefin comprising from 15 to 40% by weight of $C_{4-10}$ α-olefin;

the document EP-A-0 263 718, which discloses weakly crystalline compositions based on propylene copolymers comprising:

from 60 to 95% by weight of a random copolymer composed of 97 to 86 mol % of propylene, of 0.5 to 6 mol % of ethylene and of 2 to 13 mol % of a $C_{4-20}$ α-olefin, the molar ratio of the α-olefin to the sum of the ethylene and α-olefin which are incorporated being from 0.3 to 0.9;

from 40 to 5% by weight of a random copolymer composed of 10 to 90 mol % of propylene and of 90 to 10 mol % of a $C_{4-20}$ α-olefin;

the document GB 2 116 989, which discloses compositions based on propylene copolymers comprising:

from 60 to 95 parts by weight of a propylene co- or terpolymer comprising from 75 to 99% by weight of propylene, from 0 to 7% by weight of ethylene and from 0 to 25% by weight of 1-butene;

from 40 to 5 parts by weight of a propylene co- or terpolymer comprising from 25 to 95% by weight of 1-butene, from 0 to 10% by weight of ethylene and from 5 to 75% by weight of propylene;

the document EP-A-0 679 686, which discloses compositions formed from two random propylene copolymers comprising:

from 75 to 95% by weight of a copolymer of propylene and of an α-olefin comprising from 3 to 27% by weight of α-olefin;

from 5 to 25% of a copolymer of propylene and of an α-olefin comprising from 35 to 65% by weight of α-olefin.

However, the contents of $C_{4-10}$ α-olefin of the typical compositions described in the document EP-A-0 560 326 are too low and consequently do not allow very low ST values to be achieved. The typical compositions described in the document EP-A-0 263 718 have a predominant block necessarily comprising ethylene and consequently do not exhibit an optimum compromise between the MT and the ST. The typical compositions described in the document GB 2 116 989 comprise an excessive amount of comonomers in the predominant block and consequently have an excessively low MT, which can present problems when they are employed for the shaping of sheets, such as problems of adhesion to the rollers of the machines used for this operation. The content of copolymer very rich in α-olefin in the compositions described in the document EP-A-0 679 686 is too low to sufficiently lower the ST.

Specific compositions based on random propylene copolymers comprising monomer units derived from ethylene and 1-butene which make it possible to satisfactorily solve all the problems listed above have not been found.

To this end, the present invention mainly relates to compositions based on propylene polymers (composition (C)) comprising:

from 61 to 74% by weight of a random propylene copolymer (copolymer (A)) comprising from 8 to 16% by weight of monomer units derived from 1-butene and less than 0.5% by weight of monomer units derived from ethylene, and from 39 to 26% by weight of a random propylene copolymer (copolymer (B)) comprising from 35 to 50% by weight of monomer units derived from 1-butene and from 0 to 1% by weight of monomer units derived from ethylene.

The terms "monomer units derived from propylene", "monomer units derived from 1-butene" and "monomer units derived from ethylene" will be replaced hereinbelow by the abbreviations "$C_3$", "$C_4$" and "$C_2$" respectively.

Compositions comprising higher amounts of copolymer (A) have an excessively high ST, while lower amounts of copolymer (A) result in compositions exhibiting problems of adhesion to the rollers used during the manufacture of the sheets. Compositions comprising higher contents of $C_4$ in the copolymer (A) have excessively low MT values. Compositions comprising higher contents of $C_4$ in the copolymer (B) can give problems of morphology or alternatively of maintenance of the reactor in the gas phase. Low contents of $C_4$ in the copolymers (A) and (B) result in an excessively high ST. Higher contents of $C_2$ in the copolymers (A) and (B) result in an excessively low MT and a content of fractions soluble in organic solvents which is too high for application in sheets intended for food packaging.

The copolymers (A) which can be used in the compositions according to the invention result in a satisfactory ST and a sufficiently high MT. In addition, they can be obtained under technically and economically acceptable polymerization conditions.

The preferred compositions according to the invention comprise at least 62% by weight and at most 72% by weight of copolymer (A).

The copolymer (A) is generally such that the amount of $C_4$ is, at least 10% by weight with respect to the said copolymer (A). Amounts of at most 14% by weight make it possible to obtain compositions (C) having a good compromise between the MT and ST.

The copolymers (A) used according to the invention can comprise less than 0.5% by weight of $C_2$. This low content of $C_2$ improves the suitability for printing of the sheets manufactured from the compositions (C). Preferably, the amount of $C_2$ present in the copolymers (A) is at most 0.3% by weight. The copolymers (A) not comprising $C_2$ result in an optimum MT of the composition.

The compositions (C) according to the invention also comprise from 39 to 26% by weight of copolymer (B).

The amount of copolymer (B) is preferably at least 28% and at most 38% by weight.

This copolymer (B) preferably comprises at least 38% by weight of $C_4$. Good results are obtained when the amount of $C_4$ in the copolymer (B) is at most 45% by weight. The copolymer (B) can also comprise up to 1% by weight of $C_2$. The presence of $C_2$ makes possible the manufacture of the copolymers (B) with a higher yield. The copolymer (B) advantageously comprises less than 0.5% by weight of $C_2$. Copolymers (B) not comprising $C_2$ are particularly well suited and result in compositions (C) having an optimum compromise between the MT and the ST.

The compositions (C) according to the invention which give particularly good results comprise:
  from 62 to 72% by weight of a propylene/1-butene copolymer (A) essentially comprising from 86 to 90% by weight of monomer units derived from propylene and from 10 to 14% by weight of monomer units derived from 1-butene, and
  from 38 to 28% by weight of a random propylene copolymer (B) comprising from 38 to 45% by weight of monomer units derived from 1-butene and from 0 to 0.5% by weight of monomer units derived from ethylene.

The compositions according to the invention are preferably composed essentially of the copolymers (A) and (B). Preferably again, the copolymers (A) and (B) comprise only monomer units derived from propylene, 1-butene and optionally ethylene.

The compositions (C) according to the invention generally exhibit a melt flow index (MFI), measured according to Standard ASTM D 1238 (230° C.); load: 2.16 kg), of 0.5 to 20 g/10 min, preferably of 1 to 15 g/10 min.

The MT of the compositions (C) according to the invention, measured by differential scanning calorimetry (DSC) according to Standard ASTM D 3418, is generally at least 125° C. and preferably at least 128° C. The compositions having an MT of less than 125° C. give problems of adhesion to the drawing rollers in the lengthwise direction during the manufacture of BOPP films. The MT of these compositions is generally at most 146° C. and more particularly at most 144° C. The compositions having an MT of greater than 146° C. do not allow low-temperature sealing. Compositions (C) having an MT of 128 to 138° C. are very particularly preferred because they allow easy operation on machines for the manufacture of BOPP films, with absence of adhesion to the drawing rollers in the lengthwise direction, and use on high-speed packaging machines.

The ST of the compositions (C) according to the invention is generally at most 100° C. and advantageously at most 98° C. Compositions (C) for which the ST is at most 96° C. are very particularly preferred. Generally, the ST of the compositions according to the invention is at least 70° C. and more particularly at least 80° C. The ST is determined as follows: two coextruded and biaxially oriented films with a thickness of 25 µm are placed between the jaws of an Otto Brugger HSG/C sealing device with two heated jaws. A pressure of 3 bar is applied for one second. After cooling, a tensile test at a rate of 100 mm/min is carried out. The ST of the temperature, expressed in ° C., at which the weld exhibits a strength of 100 g/cm. The coextruded biaxially oriented films are composed of a central layer of propylene homopolymer (MFI: 2.8 g/10 min) with a thickness of 23 µm and of two outer layers of the composition (C) according to the invention with a thickness of 1 µm. To manufacture these sheets, a draw ratio in lengthwise direction of 4.5 is applied and a draw ratio in the transverse direction of 8 is applied.

The compositions (C) according to the invention exhibit both a high MT and a low ST. The compositions (C) according to the invention are generally characterized in that the MT is generally at least 26° C. greater than the ST. They consequently exhibit an optimum compromise between sealability and processability on the lengthwise drawing rollers of machines for the manufacture of BOPP films. The MT is advantageously at least 30° C. greater than the ST.

Compositions (C) exhibiting an MT at least 35° C. greater than the ST are particularly preferred.

The DSC thermogram of the compositions (C) according to the invention which is obtained as described hereinafter generally exhibits three melting peaks: a first melting peak (known hereinafter as MT1) between 115 and 145° C., a second melting peak (known hereinafter as MT2) between 70 and 130° C. and a third melting peak (known hereinafter as MT3) between 50 and 90° C. The DSC thermogram is obtained by using the following method: after an isotherm for 5 minutes at −10° C., then heating from −10° C. to 220° C. at 10° C./min, followed by maintaining at 220° C. for 10 minutes, a sample of the composition (C) (in the form of a pressed film having a thickness of approximately 50 to 100 µm) is cooled to 125° C. at 20° C./minute, then to 40° C. at 1° C./minute and subsequently to −10° C. at 20° C./minute, and is maintained at −10° C. for 5 minutes; the sample is finally reheated to 180° C. at 10° C./minute. To the best of our knowledge, the melting peak MT3 would originate from the melting of at least one fraction of the copolymer (B).

The compositions (C) according to the invention generally exhibit a hot tack range from 90 to 150° C. and more particularly from 100 to 145° C. The hot tack range is determined using the device represented in FIG. 1, which comprises a device (1) which makes it possible to attach, in the lengthwise direction, a strip of film (2) above an Otto Brugger HSG/C sealing device (3) with two jaws with a width of 1 cm (3A and 3B), a shaft (4) which makes possible the introduction of the strip between the two jaws, and a weight (5) of 63.3 g intended to be attached to the other end of the strip. The distance between the weight and the lower jaw is 8 cm, the lateral displacement distance of the film during the introduction between the jaws of the sealing device is 3 cm, and the distance between the point of attachment of the film and the upper jaw is 11 cm. The hot tack range is measured as follows: a strip with a width of 4 cm and a length of 29.5 cm of a coextruded and biaxially oriented film with a thickness of 25 µm obtained according to the method described hereinabove in connection with the measurement of the ST, attached by one end to the device (1) and by the other to the weight (5), is introduced, using the shaft (4), between the two jaws of the sealing device (3), which subsequently close for 0.5 s with a pressure of 5 bar. On opening the jaws, the percentage of weld which has remained intact is measured. This measurement is made at various temperatures between 70 and 160° C. with a frequency of 5° C. and the hot tack range is defined as being the range of temperatures within which at least 80% of the weld is observed to have remained intact after opening the jaws.

The compositions (C) according to the invention generally exhibit optical properties, such as gloss, transparency and haze which are particularly favourable. These properties are measured on the coextruded and biaxially oriented films obtained as described hereinabove. The haze, measured according to Standard ASTM D-1003, is generally at most 1.7% and at least 0.6%. The gloss, measured according to Standard ASTM D-2457 at 45°, is generally at least 78% and at most 100%. The transparency, determined according to Standard ASTM D-1746, is advantageously at least 95% and at most 100%.

The compositions (C) according to the present invention generally exhibit a hexane-soluble fraction (known hereinafter more simply as HSF), measured as indicated in "Food Drug Cosmetic Law Reports" of 1 Apr. 2000; Volume 21CFR; paragraph 177.1520; method (d) (3) (ii) and expressed as percentage by weight of fractions soluble in n-hexane at 50° C. with respect to the whole of the composition, of at most 5.5% and more particularly of at most 4.5%. They are consequently generally well suited to the manufacture of sealing layers for multilayer sheets intended for the packaging of foodstuffs.

The invention also relates to a process for the manufacture of the compositions (C). According to a first alternative form, the compositions according to the invention can be obtained by preparing the copolymer (A) and the copolymer (B) separately and by mixing these copolymers according to any technique known for this purpose.

The copolymers (A) and (B) can be prepared in a known way by copolymerization of propylene with 1-butene and, if appropriate, with ethylene. The principle of these copolymerizations is known to a person skilled in the art.

The copolymers (A) and (B) are preferably obtained by gas-phase polymerization. Such a process is preferred because it makes it possible to easily incorporate large amounts of comonomer(s). These copolymerizations can be carried out continuously or batchwise or by a combination of the two methods. The copolymers (A) and (B) can be blended, for example, by melt blending in an internal or external mixer. This blending is preferably carried out in a mixer of the extruder type.

According to a particularly advantageous alternative form, the compositions according to the present invention are prepared by successive copolymerizations, one of the copolymers being prepared during a first stage and the other copolymer being prepared, in the presence of the first, during a subsequent polymerization stage. Each of these stages can be carried out in the same polymerization mixture or in different polymerization mixtures. Preferably, the copolymer (A) is first prepared and subsequently the copolymer (B) is prepared in the presence of the copolymer (A) resulting from the first stage. A particularly preferred method for the preparation of the composition (C) consists in successively synthesizing the copolymer (A) and then the copolymer (B) in the presence of the copolymer (A) by gas-phase polymerization in successive interconnected reactors operating as stirred beds or preferably as fluidized beds. The latter alternative form gives no problem of agglomeration and results in an excellent particle size of the compositions (C) according to the invention.

The copolymers (A) and (B) can be obtained by means of any known sufficiently active and productive Ziegler-Natta catalytic system which makes it possible to polymerize propylene in a sufficiently stereospecific form and which can incorporate, in the polymer, the required amounts of 1-butene and optionally of ethylene.

The preferred catalytic systems for preparing the compositions according to the invention comprise:

a catalytic solid comprising, as essential components, magnesium, titanium and chlorine, an organoaluminium compound, preferably a trialkylaluminium, very particularly triethylaluminium, an electron-donating compound (external electron donor) generally chosen from alkoxysilanes of formula $R^1{}_n Si(OR^2)_{4-n}$ in which $R^1$ represents a hydrocarbonaceous group comprising from 1 to 12 carbon atoms, $R^2$ represents a hydrocarbonaceous group comprising from 1 to 8 carbon atoms and n is 1, 2 or 3.

The alkoxysilanes which are preferred as external electron donor are alkylalkoxy- and cycloalkylalkoxysilanes, and, among the latter, di- and trimethoxysilanes are very particularly preferred. n-Propyltrimethoxysilane, dicyclopentyldimethoxysilane and cyclohexylmethyldimethoxysilane give particularly good results.

The catalytic solids which can be used according to the invention are well known to a person skilled in the art. They generally comprise an electron-donating compound (internal electron donor) chosen from mono- and diesters of aromatic carboxylic acids, preferably from dialkyl phthalates, very particularly diisobutyl phthalate. The catalytic solids which can be used according to the present invention can also comprise greater or lesser amounts of preformed polymers originating from a pre-polymerization stage carried out during the synthesis of the said solid or from a polymerization stage directly preceding the manufacture of the compositions (C) according to the present invention.

The various constituents of the catalytic system are generally made use of so that the atomic ratio of the aluminium of the organoaluminium compound to the titanium of the catalytic solid is from 3 to 300, preferably from 10 to 250 and very particularly from 15 to 100. In addition, the molar ratio of the aluminium of the organoaluminium compound to the electron-donating compound is generally from 0.5 to 60, preferably from 1 to 50, very particularly from 2 to 30.

The other general polymerization conditions are well known to a person skilled in the art. The temperature is generally from 20 to 150° C., preferably from 40 to 95° C., very particularly from 50 to 75° C. The polymerization is generally carried out at a pressure greater than atmospheric pressure, preferably from 10 to 50×10$^5$ Pa.

The average molecular mass of the copolymers formed can be adjusted by the addition of one or more known agents for adjusting the molecular mass, such as hydrogen, diethylzinc, alcohols, ethers and alkyl halides. Hydrogen is the most commonly used.

The required amounts of monomers and of agent for adjusting the molecular mass can be introduced continuously or batchwise into the polymerization mixture.

The compositions (C) can optionally be subjected to one or more known treatments with water, an alcohol and/or a hydrocarbonaceous diluent in order to remove the catalytic residues and/or the fractions of low molecular weight.

The compositions (C) according to the present invention can comprise additives known for improving the properties thereof. These additives are, for example, stabilizers, neutralizing agents, lubricants, slip-promoting agents and antistatic agents. They are generally added by melt blending, for example during the manufacture of granules from the compositions (C) according to the invention. The MFI of the compositions (C) can also, if necessary, be adjusted by blending, preferably melt blending, with, for example, a peroxide.

As mentioned above, the compositions (C) according to the invention can be used for the manufacture of heat-sealable sheets and more particularly for the manufacture of multilayer sheets for which they constitute the sealing layer or layers. It is obvious that several compositions (C) can be used in the sealing layer or layers.

The multilayer sheets generally comprise a base layer which can be composed of any polymeric material, generally of a crystalline α-olefin polymer.

Preferably, the base sheet is composed substantially of a crystalline propylene polymer. This crystalline propylene polymer can also be a copolymer of propylene, ethylene and/or 1-butene generally comprising less than 8% by weight of these comonomers, preferably less than 5% by weight. It is obvious that the multilayer sheets can comprise, in addition to the base sheet and the sealing layer or layers comprising the compositions (C), other intermediate layers between the base sheet and the sealing layer or layers.

The multilayer sheets according to the invention can be obtained:

by causing a preshaped base sheet and one or more sheets preshaped from the compositions (C) to adhere to one another by pressing between heated rollers;

by coating a base sheet by means of a solution or dispersion comprising the compositions (C) in an organic solvent, in order to laminate the compositions (C) on the base sheet;

by extruding a layer comprising the molten compositions (C), in order to laminate it on the base sheet;

by separately extruding the layer or layers comprising the compositions (C) and the base sheet and by joining the molten extrudates via a common die;

by coextruding the layer or layers comprising the compositions (C) and the base sheet via a multichannel die.

The thickness of the multilayer sheets according to the invention is generally from 5 to 300 µm, preferably from 10 to 170 µm. The thickness of the sealing layer(s) based on the composition (C) is generally from 0.1 to 50 µm, preferably from 0.5 to 30 µm. The thickness of the base sheet is generally from 5 to 200 µm, preferably from 10 to 70 µm.

The multilayer sheets according to the invention can be used without being drawn. Preferably, they are drawn monoaxially and more particularly biaxially, for the purpose of their orientation, after coating the base sheet with the layer or layers comprising the compositions (C). This drawing can be carried out according to one of the known methods below:

a layer comprising the compositions (C) is extruded over a preformed base sheet and the multilayer sheet thus obtained is drawn biaxially;

a base sheet is drawn beforehand monoaxially, while hot, in the lengthwise direction (machine direction (MD)) by means of a series of rollers, including a metal roller, a layer of the composition (C) is extruded over this sheet, which has thus been monoaxially drawn, and the multilayer sheet thus obtained is drawn in the transverse direction (TD);

the multilayer sheet obtained by extrusion, through a common die, of the layer or layers comprising the compositions (C) and of the base sheet is drawn biaxially (in the lengthwise direction (LD) and in the transverse direction (TD)) in two successive stages or simultaneously.

The final method is preferred.

The multilayer sheets thus obtained are appropriate for any packaging application. They are advantageously used on high-speed packaging machines. They are particularly well suited to the packaging of food.

The following examples serve to illustrate the invention.

In these examples, the MFI, HSF, MT, MT1, MT2, MT3 and ST values, the hot tack range and the optical properties are measured as described above. The $C_4$ content of the copolymer (A) is determined by Fourier transform IR spectrometry, by using the absorption band at 767 cm$^{-1}$, with respect to a pressed film of 200 µm and is expressed as % by weight. The $C_4$ content of the copolymer (B) is determined from the $C_4$ content of the composition (C), measured by nuclear magnetic resonance (NMR), the $C_4$ content of the copolymer (A) and the content of copolymer (B). The content of copolymer (B) is determined from the catalytic residues of the composition (C) with respect to the copolymer (A). The $C_2$ content is determined by Fourier transform IR spectrometry from the absorption bands at 733 cm$^{-1}$ and 720 cm$^{-1}$ and is expressed as % by weight. The $C_3$ content is determined by the mass balance and is also expressed as % by weight.

EXAMPLE 1

The preparation was carried out as follows of a composition (C) comprising (percentages by weight): 70% of a copolymer (A) and 30% of a copolymer (B). The copolymer (A) comprised 87.8% of $C_3$ and 12.2% of $C_4$ and the copolymer (B) comprised 60.5% of $C_3$ and 39.5% of $C_4$. The total content of $C_4$ in the composition (C) was 20.4%.

Each of the copolymers (A) and (B) was successively prepared in two fluidized-bed reactors, each equipped with a gas distribution grid, connected in series and operating continuously. A gas flow comprising nitrogen, propylene, 1-butene and hydrogen was passed through these reactors, via a compressor, at a stable stationary concentration. A sample of the copolymer (A) was withdrawn for analysis.

The polymerization conditions are found in Table 1 below.

The catalytic system introduced into the first reactor contained:

a catalytic solid comprising 2.6% by weight of Ti and 11% by weight of diisobutyl phthalate supported on $MgCl_2$, triethylaluminium (TEAL), and n-propyltrimethoxysilane.

The characteristics of the composition (C) thus obtained are found in Table 1 below.

A composition composed of:
100 parts by weight of the composition (C) described above;
0.05 part by weight of calcium stearate;
0.05 part by weight of dihydrotalcite;
0.201 part by weight of stabilizer composed of one third by weight of pentaerythrityl tetrakis(3,5-di(tert-butyl)-4-hydroxyphenylpropionate) and of two thirds by weight of tris(2,4-di(tert-butyl)phenyl) phosphite;
0.101 part by weight of Crodamide® ER erucamide from Croda;
0.126 part by weight of Sylobloc® 45 silica from Grace Davison, was granulated in a Clextral BC45 twin-screw extruder (die at 90° C., under nitrogen).

The necessary amount of 2,5-dimethyl-2,5-di(tert-butylperoxy)hexane (DBPH) was added to the mixture in order to obtain granules for which the MFI was 5 g/10 min. These granules were coextruded on either side over a random propylene copolymer comprising approximately 0.45% by weight of ethylene and characterized by an MFI of 2.8 g/10 min, so as to obtain a film for which the total thickness after biaxial orientation (4.5 times in the machine direction and 8 times in the transverse direction) was 25 μm, with 1 μm of sealing layer comprising the composition (C). The characteristics of the sealing layer of the BOPP film thus obtained are found in Table 2 below.

EXAMPLE 2

The preparation was carried out as follows of a composition (C) comprising (percentages by weight):

63% of a copolymer (A) and 37% of a copolymer (B). The copolymer (A) comprised 88% of $C_3$ and 12% of $C_4$ and the copolymer (B) comprised 59.9% of $C_3$ and 40.1% of $C_4$. The total content of $C_4$ in the composition (C) was 22.4%.

Each of the copolymers (A) and (B) was successively prepared according to the general conditions mentioned in Example 1. The polymerization conditions and the characteristics of the composition (C) obtained are found in Table 1.

This composition (C) was granulated under the conditions described in Example 1. The granules thus obtained, the MFI of which was 5 g/10 min, were used for the manufacture of a BOPP film as described in Example 1, the sealing layer of which exhibited the characteristics mentioned in Table 2.

EXAMPLE 3R

This example is given by way of comparison.

A composition comprising only a single copolymer, containing (% by weight) 81.9% of $C_3$, 17.4% of $C_4$ and 0.7% of $C_2$, is prepared in the first of the reactors mentioned in Example 1 and according to the general conditions mentioned in this example.

The polymerization conditions and the characteristics of the composition obtained are found in Table 1.

The composition obtained was granulated under the conditions described in Example 1, except that the amount of DBPH was adjusted in order to obtain granules for which the MFI was 7 g/10 min, the content of Sylobloc® 45 was 0.1 part by weight, the content of dihydrotalcite was 0.1 part by weight, per 100 parts by weight of the composition (C), and the additions of erucamide and calcium stearate were omitted. The granules thus obtained were used for the manufacture of a BOPP film as described in Example 1, the sealing layer of which exhibited the characteristics mentioned in Table 2.

The relatively low MT of this composition results in problems of adhesion during its use as sealing layer for multilayer sheets.

EXAMPLE 4R

This example is given by way of comparison.

The preparation was carried out as follows of a composition comprising (percentages by weight):

75% of a copolymer (A) and 25% of a copolymer (B). The copolymer (A) comprised 86.5% of $C_3$ and 13.5% of $C_4$ and the copolymer (B) comprised 84.3% of $C_3$, 4.7% of $C_2$ and 11% of $C_4$. The total content of $C_4$ in the composition was 13% and the total content of $C_2$ was 1.3%.

Each of the copolymers (A) and (B) were successively prepared according to the general conditions mentioned in Example 1.

The polymerization conditions and the characteristics of the composition obtained are found in Table 1.

This composition was granulated under the conditions described in Example 1, except that the addition of the DBPH was omitted. The granules thus obtained, the MFI of which was 5 g/10 min, were used for the manufacture of a BOPP film as described in Example 1, the sealing layer of which exhibited the characteristics mentioned in Table 2.

The relatively high ST of this composition is a handicap with regard to its use as heat-sealable film on high-speed packaging machines.

TABLE 1

|  | Unit | Ex. 1 | Ex. 2 | Ex. 3R | Ex. 4R |
| --- | --- | --- | --- | --- | --- |
| (A) | weight % | 70 | 63 | 100 | 75 |
| Polymerization conditions for (A) | | | | | |
| $H_2/C_3$ | mol/mol % | 0.22 | 0.46 | 1.1 | 1.1 |
| $C_4/C_3$ | mol/mol % | 17.33 | 16.52 | 30.2 | 19 |
| $C_2/C_3$ | mol/mol % | — | — | 1.7 | — |
| Pressure | $10^5$ Pa | 31.9 | 32.05 | 36 | 36 |
| Temperature | ° C. | 60 | 60 | 60 | 65 |
| Al/Ti | mol/mol | 80 | 80 | 50 | 70 |
| Al/Si | mol/mol | 5 | 5 | 3.5 | 5 |
| Residence time | hour | 2.08 | 1.5 | 2 | 1.8 |
| Characteristics of the copolymer (A) | | | | | |
| $C_2$ | weight % | 0 | 0 | 0.7 | 0 |
| $C_4$ | weight % | 12.2 | 12 | 17.4 | 13.5 |
| (B) | weight % | 30 | 37 | 0 | 25 |
| Polymerization conditions for (B) | | | | | |
| $H_2/C_3$ | mol/mol % | 2.57 | 3.03 | — | 2.8 |
| $C_4/C_3$ | mol/mol % | 72.74 | 110 | — | 17 |
| $C_2/C_3$ | mol/mol % | — | — | — | 2.9 |
| Pressure | $10^5$ Pa | 20.1 | 21.9 | — | 19 |
| Temperature | ° C. | 60 | 67 | — | 65 |
| Residence time | hour | 2.27 | 2.42 | — | 1.8 |
| Characteristics of the copolymer (B) | | | | | |
| Polymerization conditions for (B) | | | | | |
| $C_2$ | weight % | 0 | 0 | — | 4.7 |
| $C_4$ | weight % | 39.5 | 40.1 | — | 11 |
| Characteristics of the composition (C) | | | | | |
| MFI | g/10 min | 2.3 | 3.6 | 3.5 | 4.9 |
| $C_2$ | weight % | 0 | 0 | 0.7 | 1.3 |
| $C_4$ | weight % | 20.4 | 22.4 | 17.4 | 13 |
| HSF | weight % | 3.1 | 3.9 | 46 | 4.5 |
| MT | ° C. | 131.9 | 133.2 | 117 | 130 |
| MT1 | ° C. | 137 | 139 | 120.4 | 136.2 |
| MT2 | ° C. | 114 | 114 | 101 | 113.6 |
| MT3 | ° C. | 78 | 70 | — | — |

TABLE 2

| Sealing layer comprising (C) | Unit | Ex. 1 | Ex. 2 | Ex. 3R | Ex. 4R |
|---|---|---|---|---|---|
| MFI | g/10 min | 5 | 5 | 7 | 5 |
| ST | °C. | 95 | 86 | 92 | 108 |
| Hot tack range | °C.–°C. | 105–142 | 105–135 | 95–135 | |
| Haze | % | 1.5 | 1.3 | 1.8 | |
| Gloss | % | 79 | 80 | 77 | |
| Clarity | % | 96 | 97 | 95 | |

The invention claimed is:

1. A composition based on propylene polymers having a melting temperature of 125 to 146° C. and a sealing temperature below 100° C. comprising:
   from 61 to 74% by weight of a random propylene copolymer (copolymer (A)) comprising from 8 to 16% by weight of monomer units derived from 1-butene without monomer units derived from ethylene, and
   from 39 to 26% by weight of a random propylene copolymer (copolymer (B)) comprising from 35 to 50% by weight of monomer units derived from 1-butene without monomer units derived from ethylene.

2. A composition according to claim 1, having a melting temperature of 128 to 138° C. and a sealing temperature below 98° C., comprising:
   from 62 to 72% by weight of a propylene/1-butene copolymer (A) essentially comprising from 86 to 90% by weight of monomer units derived from propylene and from 10 to 14% by weight of monomer units derived from 1-butene, and
   from 38 to 28% by weight of a random propylene copolymer (B) comprising from 38 to 45% by weight of monomer units derived from 1-butene without monomer units derived from ethylene.

3. A composition according to claim 1 exibiting a melt flow index (MFI) measured according to Standard ASTM D1238 (230° C.; load: 2.16 kg), of 1 to 15 g/10 min.

4. A composition according to claim 1 exibiting a sealing temperature of at most 90° C.

5. A composition according to claim 1 characterized in that the melting temperature is at least 35° C. greater that the sealing temperature.

6. A composition according to claim 1 exibiting a melting peak MT3 of 50 to 90° C.

7. A composition according to claim 2 exibiting a melt flow index (MFI) measured according to Standard ASTM D1238 (230° C.; load: 2.16 kg), of 1 to 15 g/10 min.

8. A composition according to claim 2 exibiting a sealing temperature of at most 90° C.

9. A composition according to claim 2 characterized in that the melting temperature is at least 26° C. greater that the sealing temperature.

10. A composition according to claim 2 exibiting a melting peak MT3 of 50 to 90° C.

11. A composition according to claim 3 exibiting a sealing temperature of at most 90° C.

12. A composition according to claim 3 characterized in that the melting temperature is at least 35° C. greater that the sealing temperature.

13. A composition according to claim 3 exibiting a melting peak MT3 of 50 to 90° C.

14. A composition according to claim 4 characterized in that the melting temperature is at least 26° C. greater that the sealing temperature.

15. A composition according to claim 4 exibiting a melting peak MT3 of 50 to 90° C.

16. A composition according to claim 5 exibiting a melting peak MT3 of 50 to 90° C.

17. A process for the manufacture of a propylene polymer composition having a melting temperature of 125 to 146° C. and a sealing temperature below 100° C. comprising mechanical melt blending
   from 61 to 74% by weight of a random propylene copolymer (copolymer (A)) comprising from 8 to 16% by weight of monomer units derived from 1-butene without monomer units derived from ethylene, and
   from 39 to 26% by weight of a random propylene copolymer (copolymer (B)) comprising from 35 to 50% by weight of monomer units derived from 1-butene without monomer units derived from ethylene
   in an internal or external mixer.

18. A process for the manufacture of a propylene polymer composition having a melting temperature of 125 to 146° C. and a sealing temperature below 100° C. comprising copolymerizing
   from 61 to 74% by weight of a random propylene copolymer (copolymer (A)) comprising from 8 to 16% by weight of monomer units derived from 1-butene without monomer units derived from ethylene in a first stage, and
   from 39 to 26% by weight of a random propylene copolymer (copolymer (B)) comprising from 35 to 50% by weight of monomer units derived from 1-butene without monomer units derived from ethylene
   wherein copolymer B is synthesized in a second stage in the presence of copolymer (A).

19. A heat-sealable multilayer sheet, characterized as comprising at least one sealing layer composed substantially of a propylene polymer composition having a melting temperature of 125 to 146° C. and a sealing temperature below 100° C. comprising:
   from 61 to 74% by weight of a random propylene copolymer (copolymer (A)) comprising from 8 to 16% by weight of monomer units derived from 1-butene without monomer units derived from ethylene, and
   from 39 to 26% by weight of a random propylene copolymer (copolymer (B)) comprising from 35 to 50% by weight of monomer units derived from 1-butene without monomer units derived from ethylene.

20. A packaging material characterized as comprising a heat-sealable multilayer sheet further characterized in that the sheets comprise at least one sealing layer composed substantially of a propylene polymer composition having a melting temperature of 125 to 146° C. and a sealing temperature below 100° C. comprising:
   from 61 to 74% by weight of a random propylene copolymer (copolymer (A)) comprising from 8 to 16% by weight of monomer units derived from 1-butene without monomer units derived from ethylene, and
   from 39 to 26% by weight of a random propylene copolymer (copolymer (B)) comprising from 35 to 50% by weight of monomer units derived from 1-butene without monomer units derived from ethylene.

* * * * *